3,533,563
METHOD AND APPARATUS FOR DEFIBRATING AND SIMULTANEOUSLY CONDITIONING CELLULOSE MATERIAL
Erik Folke Eriksson, Johanneshov, Sweden, assignor to AB Calor & Sjögren, Solna, Sweden
Filed Apr. 19, 1968, Ser. No. 722,735
Claims priority, application Sweden, Apr. 21, 1967, 5,639/67
Int. Cl. B27l 11/08
U.S. Cl. 241—28                 15 Claims

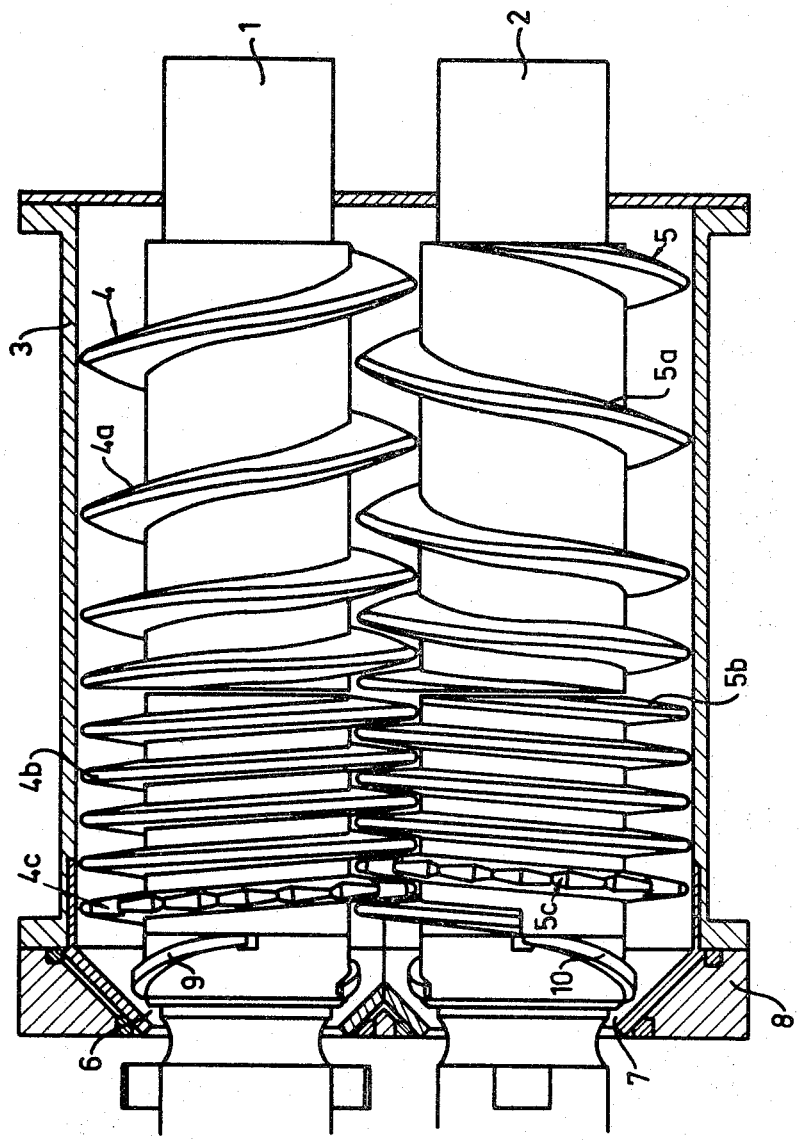

ABSTRACT OF THE DISCLOSURE

The invention concerns treatment of cellulose material between intermeshing screw threads at high concentration and a double-screw apparatus for performing the process, a particular feature of the invention being the treatment performed between intermeshing screws the crests of which are serrated.

---

The present invention refers to a process and an apparatus for finally defibrating and simultaneously conditioning (refining) cellulose material.

In the Hjelte U.S. Pat. 3,064,908 there is described an apparatus for mixing and working material, in particular cellulose material, said material being subjected to compression between lateral surfaces of mutually engaging screw threads provided on screws coupled for joint rotation. In the specification it is stated that the apparatus as far as its action is concerned is most closely related to the well-known pug mill in which defibration is performed by some kind of hydraulic action rather than by a milling action proper based on cutting cooperation between relatively movable milling or beating elements. In the above-mentioned Hjelte patent it is stated that in the operation of the pug mill comparatively small amounts of water are required in contrast to conditions prevailing for example, in a conventional beater or Jordan mill in which water must be added to the cellulose mass at least to such an extent that a groutlike consistency is obtained.

Thus, when the apparatus according to the said Hjelte patent is used the mass to be treated is supplied at a comparatively high solids concentration, the dry matter content during and after the treatment having values exceeding about 12.5 percent. In a pamphlet published in July 1962 and relating to the same apparatus concentrations up to 20 percent are mentioned. At concentrations from about 10 percent upward the cellulose material is a granular mass in which the entire water content is held by capillary action or occlusion and which definitely cannot be said to be flowable or even groutlike.

The present invention relates to a process of finally defibrating and simultaneously conditioning (refining) cellulose material in which the material at a concentration preventing the material from flowing is exposed to compression between the side surfaces on mutually intermeshing screw threads provided on screws coupled for joint rotation, the process in all these respects corresponding to the process as performed with an apparatus according to the said Hjelte Pat. No. 3,064,908.

In the known apparatus the working action proper has been performed between the side surfaces of the screw threads interacting with each other at a predetermined minimum spacing, the axial thickness of said screw threads at least at the outer circumference being a fraction of the pitch, a circulation of the material being caused to take place by the provision of an open space between the inner edges of the band-shaped screw windings and the shafts or axes of the screws.

During continued investigations in the further development of the known apparatus it appeared that an extremely satisfactory working effect also is obtained by using screws the windings of which without the provision of an open interspace extend from a solid shaft body, provided that portions of the material which are supplied at a dry matter concentration exceeding about 12.5 percent are exposed to radial compression in the space between the peripheral edge surface of the thread crest of one of the screws and the thread groove bottom of the other screw.

The working action obtained in this process thus comprises a combination of a rolling, kneading and mixing treatment of the material in the zone of engagement between opposed side surfaces of the intermeshing screws and a strong compression of certain portions of material in the groove bottom between such bottom and the opposite circumferential surface of the other screw thread. A working between opposed side surfaces does not entail any such cutting action on the material as would involve a risk of reduction of the length of the individual fibers because the minimum spacing between opposed side surfaces of the screws everywhere is considerably greater than the average particle size of the material. The treatment in the groove bottom is performed between opposed working surfaces spaced from each other by a distance which nowhere is substantially less than the minimum spacing between the side surfaces; also here any cutting action due to capture of material particles between cooperating opposed working elements is avoided due to the fact that rounded circumferential portions of respectively the screw body of one screw and the circumference of the opposed screw act on these material portions by a combination of radially directed pressure and a rolling action caused by the difference in circumferential velocity between the groove bottom and the outer circumference of the screw crest.

Intensive tests have shown that a modification of the radial working component performed between the bottom of the screw and the peripheral edge surface which to a certain extent eliminates the rolling component of the working action will yield a considerably improved result in respect to certain important properties of the final product. This modification of the working effect is obtained, according to the invention, by exposing separate portions of the material to local compression between separate zones of the edge surface on the screw crest of one of the screws and the groove bottom of the other screw. Qualitative improvements of the material worked in comparison with a working between completely smooth groove bottom and peripheral edge surfaces have been observed in particular regarding stretch and tear.

It has previously been proposed to use in the treatment of cellulose material as a conveying and pretreating device an apparatus having mutually interengaged conveyor screws (German Pat. No. 592,523). The known apparatus has explicitly and exclusively been devised for the treatment of paper material in a liquid state and the apparatus has served the specific purpose to break up individual compact accumulations of fibrous material without damaging already isolated individual fibers prior to feeding the treated mass into a mill comprising two millstones between which the mass is to be finally treated. In respect to these requirements the screws of the known device have operated with a very narrow gap between both the side surfaces and respectively the groove bottom and the opposed circumferential portion of the engaging screw, the passage throughout the working zone having such a width that knots appearing in the treated material are crushed whereas individual fibers are flown through the apparatus by the suspending liquid without being subjected to any working. Thus in this known device only certain component parts of the material have been subjected to a purely mechanical crushing. In accordance therewith the opposed side surfaces as well as the peripheral surfaces of the screws have been provided with furrows or flutes for the obvious purpose of increasing the mechanical crushing action on solid lumps of material passing through the device.

The process according to the present invention is based on a treatment of cellulose material at high concentration, and an apparatus suitable for such a treatment is in accordance with the aforesaid Hjelte patent of a type in which in a housing provided with inlet and outlet at least two screws are arranged in mutually overlapping relation, said screws being coupled with each other for joint rotation and being provided with screw flights extending substantially radially from the screw body and mutually extending into each other's bodies of rotation for treating material within the range of intermesh between opposed side surfaces of the screw crests; in contrast to the known apparatus adapted for the treatment of cellulose material at low concentration the axial thickness of the screw crests in the apparatus according to the present invention is, at least at the outer circumference, a fraction of the pitch of the screws which means that no abrading or cutting working action will take place between opposed side surfaces in respect to any part of the cellulose material passed through apparatus.

In a further development of the apparatus known from the aforesaid Hjelte patent the apparatus for performing the process according to the present invention is characterized in that the radially outermost portions of the peripheral edge of each screw crest have a minimum spacing from the bottom of the opposed thread groove by a distance greater than the particle size of the cellulose material, thereby to cause portions of the material to be compressed without any cutting action between the peripheral edge and the groove bottom.

In the previously mentioned known apparatus adapted for the treatment of cellulose material at low concentration it has not been necessary to cause all the material supplied in the form of a liquid suspension to pass through the zone of intermesh between the screws, the greater part of the liquid and the already isolated fibers suspended therein passing through the apparatus via the interspace between the periphery of the screws and the surrounding housing. In the apparatus according to the present invention in which nonflowable material is treated, practically the whole material will pass through the zone of intermesh between the screws. The material is carried as a plug or body filling the thread grooves into the zone of intermesh, the consequential reduction in area being compensated, on the one hand, by the compression of the mass between opposed screw surfaces and, on the other hand, by a certain backward damming of the mass. The extent in which the mass is forced into and through the zone of intermesh or displaced in a backward direction is dependent on a plurality of constructive and operational factors among which the following may be specifically mentioned: The pitch, the depth of the thread, the cross-sectional shape of respectively the screw groove and the screw crest, the frictional coefficient of the screw material, the concentration of the mass and the cohesive forces acting within the mass body or plug filling the thread groove, the rotational velocity, the rate of feed and discharge, etc. Obviously, an essential factor is the cross-sectional shape of the thread groove filled with the mass of material; in this respect experience has shown that a parallel trapezoidal cross-section between outwardly tapering screw crests favours a good adhesion between the thread and the mass provided that the ratio between thread depth and the opening width of the thread groove at the outer periphery amounts to values in excess of 3:2, preferably 2:1.

For the performance of the particularly advantageous process according to the present invention in which separate portions of the material are subjected to local compression a particularly advantageous embodiment of the apparatus is characterized in that a succession of indentations in the form of cogs, teeth or rounded depressions extend at least about a portion of the circumference of the screw thread crest.

The working action obtained in the apparatus according to the invention when the process of the invention is performed is, on the one hand, a final defibration, i.e., such a cleavage of coherent fiber bundles that the mass obtained at least to a substantial extent is composed of individual fibers and, on the other hand, a conditioning or refining intended to confer to the mass new properties which are advantageous in respect to the further handling and use thereof. In respect to felting properties a crimping of the individual fibers is desirable. Such a crimping may be obtained by a treatment of the mass involving a granulation, i.e., an agglomeration of small portions of the mass into coherent and mutually substantially independent accumulations of fibers. With the aid of the process and the apparatus according to the invention it is possible to bring about a complete, highly uniform granulation of the final product which in addition to a certain extent is controllable by suitable adjustment of operational parameters, the fibers in each individual fiber accumulation or mass particle being irregularly felted together and thereby fixed in a state of crimp, which to a great extent is retained also after further treatment, such as a resolution of the particle structure by beating. The persistence of the crimping may be improved by such a control of the factors responsible for the internal friction within the material, such as the concentration of the material, the spacing between opposed side surfaces of the screw threads within the zone of intermesh, the compacting pressure in the groove bottom, the treatment time within the working zone and the rotational velocity of the screws, that at least the material occupying the zone of intermesh between the screw threads is heated to a temperature at which the lignin will be softened, preferably about 80° C.

The apparatus according to the invention may be combined with a device comprising conveying screw flights provided on the same shafts as the working screw threads and adapted to convey the material from an inlet through a zone of condensation, said conveyor screw flights having decreasing pitch from the inlet towards the working screw threads. This conveyor device may be constructed as a dewatering device in which case the housing walls surrounding the conveyor screw flights are porous or apertured so that the material may be fed into the apparatus at a concentration lower than about 12.5 percent and even in a substantially grout-like or liquid condition, the material being dewatered during the forward transport towards the treating zone proper formed by the mutually intermeshing working screw threads to a concentration above the said value of 12.5 percent and preferably exceeding 25 percent.

The invention will be described in greater detail by reference to the attached drawing which is a schematical plane view of a device according to the invention adapted for the performance of the process according to the invention, this device comprising two mutually intermeshing screws enclosed by a housing shown in section.

Parallel shafts 1 and 2 are supported at both ends in suitable bearings not shown and extend through a housing 3 enclosing the portions of the apparatus by means of which the working according to the invention is performed. Shafts 1 and 2 are coupled for joint rotation in mutually opposed directions, e.g., with the aid of cog wheels not shown. Within the housing each shaft 1 and 2 carries a screw thread 4 and 5, respectively, extending over the greater part of the length of the shafts 1 and 2 within housing 3. The cross-sectional shape of the housing 3 is adapted to the common envelope surface of the mutually intermeshing screws in such a way that apart from a feed opening for the material the inner surface of housing 3 everywhere extends closely adjacent the common envelope surface of the mutually intermeshing screw threads 4 and 5.

The screw threads 4 and 5 are composed of two sections each, one section 4a, 5a having a pitch decreasing from the right hand end of the housing 3 to the left hand end, the other section 4b, 5b having a constant pitch less than the pitch of the adjacent portion of section 4a, 5a and extending from the left hand end of section 4a, 5a to the opposed end of housing 3 to the left on the drawing. Screw sections 4a, 5a are operated to convey and compact the material fed into the apparatus towards screw sections 4b, 5b in which the actual working of the material will take place. The feed opening is provided above the portion of largest pitch of sections 4a, 5a of screws 4, 5. Thus, in the embodiment shown in the drawing, the feed will take place perpendicularly to the plane of the paper at the right hand end of housing 3.

At the end of the housing opposite to the feed opening one annular discharge opening each is provided in the end wall of the housing about the outwardly extending portions of shafts 1 and 2. The end wall 8 is constricted towards these openings whereby a certain resistance is offered to the discharge of the material through the discharge openings. The discharge openings 6 and 7 may be provided with a controllable area, for example, by supporting end wall 8 for telescopically shifting movement on a portion of and in the longitudinal direction of the housing. While in this case the inner surface of end wall 8 is exposed to the pressure of treated material dammed up against such wall, the discharge conditions may be controlled by applying an opposed force by means of counter weights, springs or hydraulic or pneumatic means tending to shift the housing in the opposite direction. Obviously, by proper choice of the opposed force the discharge pressure and rate of discharge of the mass and thereby the intensity of the treatment within the apparatus may be controlled. In the conically tapered space within end wall 8 shafts 1 and 2 each carry at least one screw flight 9 and 10, respectively, promoting the discharge of material through openings 6 and 7.

On both sections 4a, 4b and 5a, 5b the screw threads 4, 5 have outwardly tapering, substantially trapezoidal cross section. The inclination of the side surfaces to the radial plane will in practice be about 5° to 15°. The ratio between the pitch and the cross-sectional dimension of the threads is so chosen within sections 4a, 5a that there will be no appreciable compression of supplied cellulose material between opposed surfaces of the intermeshing thread portions on both screws 4, 5. In contrast thereto the cross-sectional dimensions and the pitch of the screw threads are thoroughly coordinated within screw sections 4b, 5b in order to obtain a compression of material portions both between opposed side surfaces on mutually intermeshing thread windings and between the groove bottom of one of the threads and the outer peripheral edge of the other thread, the mutual spacing everywhere being chosen so that any risk of a shortening of the fibers by cutting action is avoided. In actual practice opposed surfaces will be spaced apart between 2 and 6 millimeters.

In the embodiment shown in the drawing one thread winding each on shafts 1 and 2 is shown provided with teeth-forming incisions 4c and 5c in accordance with a preferred embodiment of the invention. Normally, a greater part of the thread windings in sections 4b, 5b will be provided with such teeth which also may extend over the complete sections 4b, 5b. The teeth in the present embodiment are in the form of substantially triangular incisions starting from equally spaced points on the outer periphery of the thread windings.

Within screw sections 4b, 5b the peripheral surface of the screw crests has a width amounting to a fraction of the pitch of the screws. This factor is of importance in respect to the way in which a screw crest will enter into an opposed thread groove filled with cellulose material. Also the ratio between the depth of the thread and the opening width of the thread groove on sections 4b, 5b is a factor of importance in respect to the adhesion of the cellulose mass to the screw. In the embodiment shown this ratio approximately amounts to the preferred value of 2:1. Suitably, the ratio must not be less than 3:2.

The way of operation of the device described is as follows. Cellulose mass having a concentration exceeding 12.5 percent dry matter, preferably 25 percent, is fed into the range of screw sections 4a, 5a and is conveyed and condensed within this section so that the thread grooves are practically completely filled at the end of sections 4a, 5a and within the complete sections 4b, 5b. Within sections 4b, 5b the cellulose mass enclosed within the thread grooves, due to its adhesion to the thread and its internal cohesion caused by the high concentration, will participate all the time in the rotation of the screws whereby the complete mass repeatedly will be caused to pass through the gap between opposed walls on the screw threads within the zone of intermesh. The rate at which the mass moves through the working zone is dependent on the rate of supply, the rate of discharge as determined by the opening area of the discharge openings, the rotational velocity of the screws and, of course, the specific properties of the mass itself. As the time during which the mass remains in the apparatus is a factor of great importance for the intended working effect the control of the area of the discharge openings is an important factor in the adjustment of the machine in respect to the working action required by a certain cellulose material in order that optimum properties are to be obtained. Other operational factors which may be controlled without altering the construction of the apparatus are, for example, the rotational velocity of the screws and the amount of mass supplied per unit time.

A very specific working effect is obtained within the portion of screw sections 4b, 5b in which the thread crests are provided with teeth. As the peripheral speed is considerably greater on the outer periprery of the thread crests than at the bottom of the thread grooves an accumulation of material will be pressed against the opposed groove bottom within the range of each incision, such accumulation being fed forward simultaneously under the action of the following tooth flank in relation to the portion of the groove bottom where the accumulation originally has been deposited; after a complete revolution any remaining portions of the accumulated matter will be broken up when again meeting the quickly passing teeth. Obviously, the working action is not very easily analysed as to its details but appears to improve certain important physical factors such as elongation and tear of the material obtained by the treatment. Such an effect is indicated by the following tables which permit a comparison between the effects obtained by a treatment of a mass between mutually intermeshing screw threads having smooth edge surfaces (Table A) as compared to otherwise identical treatment between mutually intermeshing screw threads having the edge surfaces provided with radially recessed portions (Table B), it being understood that in the tests on which Table A is based operation conditions were adjusted to yield no treating effect at all in respect to the factors in question.

TABLE A

|  | Strength level starting material | Change in relation to starting material |
|---|---|---|
| Breaking length | 9,500 | No change. |
| Elongation, percent | 5 | Do. |
| Tear | 120 | Do. |

TABLE B

|  | Strength level starting material | Change in relation to starting material. |
|---|---|---|
| Breaking length | 8,500–9,000 | Reduction 1,000–1,500 m. |
| Elongation, percent | 7–8 | Increase 1–2. |
| Tear | 120–150 | Increase 10 to 30 units. |

The apparatus may be modified in many respects in comparison with the embodiment shown.

The cross-sectional shape of the screw thread on sections 4a, 5a may be modified in comparison with the shape shown. Thus it is possible, for example, to use shafts 1 and 2 having a diameter in the range of sections 4a, 5a different from the diameter in the range of sections 4b, 5b. It is possible to provide between sections 4a, 4b and 5a, 5b transition sections free from screw threads. The housing may be provided with means within the range of screw sections 4a, 5a permitting the mass to be dewatered through pores or perforations in the housing walls. In this case it is possible to supply the material to be treated at a lower concentration and to combine the transport from the inlet to sections 4b, 5b with such a dewatering that when entering the working zone within sections 4b, 5b the material has the concentration intended for treatment in accordance with the invention. Some of the screw sections may be exchangeable. This applies in the first place to the working sctions 4b, 5b which may be designed as a sleeve adapted to be placed upon the core of the respective shaft 1, 2. Hereby it will be possible to change such parameters as the pitch of the screw thread, the mutual spacing of opposed screw surfaces, the construction and distribution of teeth provided around the periphery of the screw thread, etc., in respect to properties of the material to be treated different from properties of a previously treated material.

In the drawing the peripheral edge surface of the screw crests has been shown to have an outwardly concave curvature in axial section. It is of course within the spirit of the invention to provide the opposed groove bottom with a corresponding inwardly concave curvature. It is also possible to provide the peripheral surface with a modified cross-sectional profile, e.g., by providing grooves extending circumferentially of the peripheral surface. While the teeth in the embodiment shown have a sharp corner at the periphery the outer end of the teeth may also be flattened.

It is, of course, also possible to provide the apparatus with screws having identical direction of pitch and coupled for joint rotation in the same direction.

What I claim is:

1. A process of defibrating and simultaneously conditioning cellulose material in which the material at a concentration preventing the material from flowing is exposed to compression between the side surfaces of mutually intermeshing screw threads provided on screws coupled for joint rotation, characterized in that portions of the material which is supplied at a dry matter concentration in excess of about 12.5 percent are exposed to radial compression in the space between the peripheral edge surface of the thread crest of one of the screws and the groove bottom of the other screw.

2. The process as claimed in claim 1, characterized in that separate portions of the material are exposed to local compression between zones of the edge surface of one of the screw threads and the thread bottom of the other screw.

3. The process as claimed in claim 1, characterized in that the material is supplied at a dry matter concentration in excess of 25 percent.

4. The method as claimed in claim 1, characterized in that small accumulations of material are compressed against the thread groove bottom and are again broken up after one revolution when again entering into the zone of intermesh between the screw threads.

5. The process as claimed in claim 1, in which the individual fibers of the cellulose material are crimped, characterized by so controlling the discharge rate of the mass that the mass leaves the treating space between the screw threads in a granulated state.

6. The process as claimed in claim 5, characterized in that factors determining the internal friction within the material such as the concentration of the material, the spacing between opposed side surfaces on the screw threads within the zone of interengagement, the compacting pressure against the thread groove bottom, the time during which the material is retained in the working zone and the rotational speed of the screws, are so controlled that at least the material present in the zone of intermesh between the screw threads is heated to a temperature at which the lignin softens.

7. The process as claimed in claim 6, characterized in that said factors are controlled in such a way that the material is heated to about 80° C.

8. The process as claimed in claim 5, characterized in that the time during which the material remains in the working zone is controlled by adjusting the area of the material outlet from the working zone.

9. The process as claimed in claim 4, characterized in that the compacting pressure against the thread groove bottom is controlled by providing on at least one of the screws a screw thread the peripheral surface of which is radially depressed between radially extended portions.

10. A device for defibrating and simultaneously conditioning cellulose material, said device comprising a housing having an inlet and an outlet, two coextensive screws coupled for joint rotation and provided with screw threads extending substantially radially from the screw body and intermeshing with each other for performing a treating action on material present within the range of intermesh between opposed side surfaces of the screw threads, the axial thickness of said screw threads at least at the outer periphery being a fraction of the pitch, characterized in that the radially outermost zones on the peripheral edge of each screw thread are spaced from the bottom of the opposed thread groove by a distance greater than the particle size of the cellulose material, thereby to cause portions of the material to be compressed without cutting action between the peripheral edge and the groove bottom.

11. The device as claimed in claim 10, characterized in that the thread grooves have a parallel trapezoidal cross-sectional shape between outwardly tapering screw crests, the ratio between thread depth and opening width of the thread groove at the periphery amounting to values in excess of 3:2, preferably 2:1.

12. The device as claimed in claim 10, characterized in that a series of indentations in the form of cogs, teeth or rounded depressions extend at least about a portion of the outer circumference of the screw thread crest.

13. The device as claimed in claim 10, characterized in that the pitch of the screw threads decreases incrementally or successively from the inlet to the outlet, only some thread windings having decreased pitch being provided with indentations.

14. The device as claimed in claim 10, characterized in that at least some of the screw windings comprising sections having indentations have a cross-section of outwardly tapering wedge shape.

15. The device as claimed in claim 14, characterized in that the peripheral edge surface of the screw threads in axial section has outwardly convex curvature.

References Cited

UNITED STATES PATENTS

| | | | |
|---|---|---|---|
| 484,056 | 10/1892 | Simonet | 241—251 |
| 1,532,649 | 4/1925 | Bieber | 241—251 |
| 3,064,908 | 11/1962 | Hjelte | 241—252 |

FOREIGN PATENTS 917,110  1/1963  Great Britain.

GERALD A. DOST, Primary Examiner

U.S. Cl. X.R.

241—251, 261